THRALL & RAYMENT.
Corn Planter.
No. 85,346.     Patented Dec. 29, 1868.
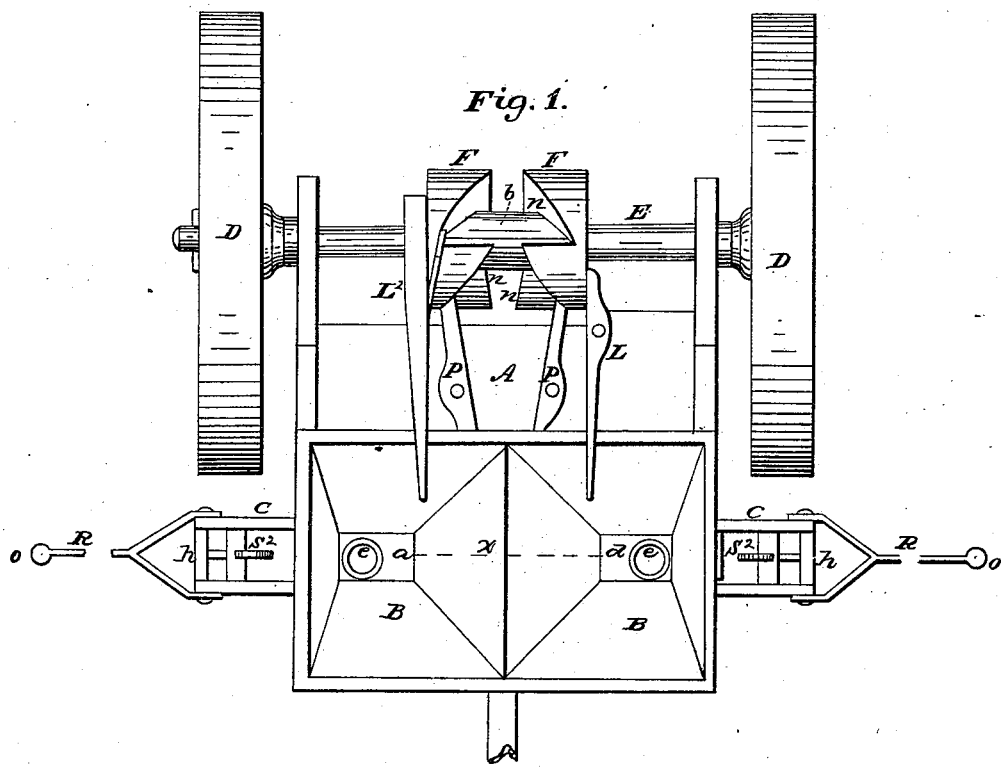
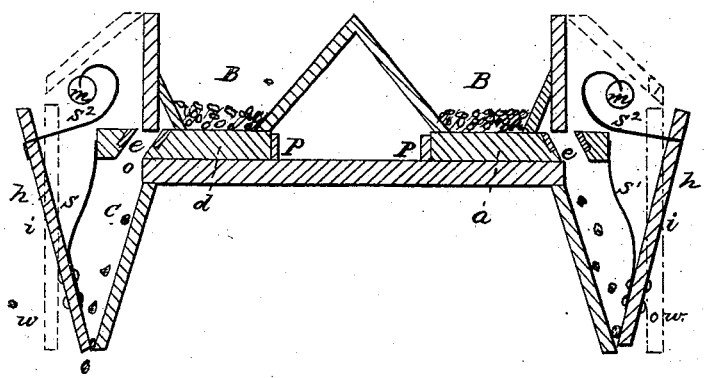

United States Patent Office.

EMMA THRALL, (ADMINISTRATRIX OF THE ESTATE OF GEORGE W. THRALL, DECEASED,) AND WILLIAM L. RAYMENT, OF BURLINGTON, MICHIGAN.

Letters Patent No. 85,346, dated December 29, 1868.

IMPROVEMENT IN CORN-PLANTERS.

The Schedule referred to in these Letters Patent and making part of the same.

*To all whom it may concern:*

Be it known that I, EMMA THRALL, representing my deceased husband, GEORGE W. THRALL, the actual inventor, and acting as the legal administratrix of his estate, and I, LEWIS W. RAYMENT, both of the town of Burlington, in the county of Calhoun, and State of Michigan, have invented certain new and useful Improvements in Corn-Planters; (that is to say, the aforesaid GEORGE THRALL did, during his lifetime, make certain improvements stated, which were subsequently added to and perfected by said RAYMENT;) and we do hereby declare that the following is a full, clear, and exact description of the same, reference being had to the annexed drawings, making part of this specification, in which—

Figure 1 is a plan view.

Figure 2 is a transverse section in the line $x$.

Similar letters of reference indicate like parts in both figures.

Our invention relates to an improved mode of operating the seed-slides in connection with certain arrangements of and attachments to the dropping-tubes, so that the seed may be deposited in the furrows, with less danger of scattering, and be planted to row both ways with more exactness than by any of the usual modes; and the better to enable others skilled in this branch of mechanical art to construct our invention, we will now proceed to describe the same.

Our machine is designed to be drawn by one or two horses, to plant two rows at once.

A represents the frame;

B, the two seed-hoppers;

$e$, the seed-cups, inserted or formed in the seed-slides;

C, the dropping-tubes; and

D, the traction-wheels, which we usually construct with a broad tire, to enable them to act as coverers, and to pack the earth around the seed.

One of the wheels is keyed fast to the axle E, which revolves in bearings in the frame, and the other wheel is loose, to enable the machine to turn short, as usual with this class of corn-planters.

The seed-slides $a$ are usually strips of hard wood, which work in a casing under the seed-hoppers, the outer end of each slide being provided with a sloping perforation, $e$, to fill with the seed, which drops into the tubes C, as soon as the perforated portion has passed beyond the casing-bottom. Said slides are operated as follows:

A pair of disks, F, with cam-like indentations, as seen at $n$, in their inner faces, and connected to or formed with a short sleeve, $b$, are fitted so as to slide on the axle, and be clutched or unclutched with it by any of the usual devices for that purpose, by means of a lever, L', in the hands of the driver.

Two pivoted bars, $p$, are so arranged, on top of the frame, that their outer ends will overlap the cam-faces of the disks, and their inner, the ends of the seed-slides.

We extend the seed-tubes beyond the sides of the frame and hopper, so that the lower or delivery-ends will come opposite the centre of the rims of the traction and covering-wheels.

The seed-tubes C are generally made rectangular, of wooden strips, as seen, but the outside strips $h$ are pivoted to the fixed sides, as shown at $i$, to allow them to vibrate freely.

A bent spring, $s^1$, is attached below this centre of vibration, extending upwards, so as to act against the end of the seed-slide, while another bent spring, $s^2$, is fastened to the upper end of each vibrating strip $h$, and to a stud, $m$, so as to operate in a contrary direction, as will be more fully explained hereinafter.

R represents marking-rods, (broken short,) which are pivoted at the inner or forked ends by wires, inserted through the lower ends of the fast sides of the seed-tubes, as seen at $w$.

We have not exhibited any device for making the furrow, but will say here that we propose to use the ordinary drill-tooth, hung, in the usual manner, in front of the seed-tubes, or, in place thereof, wheels or rollers, with V-shaped rims.

The mode of operation is as follows:

As the wheels of the machine revolve, the converging sides $n$ of the cams, draw the outer ends of the pivoted bars $p$ together, and force apart their inner ends, so as to move the seed-slides against the pressure of the springs sufficiently far to discharge the seed in the perforations or cups (filled from the hopper) into the seed-tubes; but, before the seed-cups are thus uncovered, the action of the slides against the springs has moved or vibrated the strips, so as to close up the seed-tubes at the bottom, where the seed is held, until the bars $p$ are sprung into the succeeding indentations $n$.

When the upper springs draw back the pivoted strips to their first position, as shown by the dotted lines in fig. 2, the tube is opened, and the seed falls the remaining short distance securely into the furrow, and is covered by the wheels.

When the seed is thus planted at proper distances apart, in two rows, across the field, the operator, guided by the click of the bars in the cam-notches, stops his team at the instant of the last planting, and by means of the lever L', unclutches the cam-disks from the axle, and unhooking the marking-rod R on the turning side, drops the rod from a perpendicular to a horizontal position, so the protuberance $o$, at the end, will make a plain mark in the ground. Then, by a cord, with which the rod is provided, he lifts it up, and secures it in an upright position, as before.

He then turns the machine until he places it in such position that the near seed-tube stands over the aforesaid mark, at a right angle with the path of the machine.

The operator now drops the seed for the first two hills in the new rows, in partially rotating the cam-disks, by the means of a hand-lever, L², hung on the axis, said lever being provided with a swinging rod, $f$, the hooked end of which catches in the cam-notches, when, clutching the cams with the axle, he starts up his team, planting and covering as before, being guided in the line by the marks of the covering-wheels, and using, if necessary, the markers occasionally as a gauge to keep the new lines straight and parallel, and at the end of each course, right and left, before turning, to mark the ground for the first two plantings, as before described.

In thus dropping the seed by successive stages, we insure the laying of the seed in the furrow where it drops, but when it drops the whole distance to the ground, as in the ordinary way, it is very liable to scatter, owing to the impetus of its descent, and the use of the markers, in connection with the arrangement for planting the first two hills by hand, enables an ordinary operator, on tolerably even ground, to row both ways with accuracy.

Having described our invention,

What we claim, and desire to secure by Letters Patent, is as follows:

1. The arrangement of the cam-disks F, levers L¹ L², and the vibrating bars $p$, with the wheel-axle E, seed-slides $a$, and with the frame and hoppers of the machine, substantially as and for the purpose specified.

2. Constructing the seed-dropping tubes C with vibrating sides $h$, when used, in combination with seed-slides $a$ and springs $s^1 s^2$, for the double dropping of the seed, substantially in the manner described.

3. The hinged marking-rods R, in combination with the tubes C, substantially as and for the purpose set forth.

EMMA THRALL,
*Administratrix of Estate*
*Of my deceased husband, George W. Thrall.*
WM. L. RAYMENT.

Witnesses:
GEO. M. CADY,
OTTO L. JOHNSON.